United States Patent [19]

Josey

[11] 3,938,869
[45] Feb. 17, 1976

[54] GOLF BAG SUPPORTED BEVERAGE CAN HOLDING ASSEMBLY

[76] Inventor: Robert M. Josey, 814 E. Grand, Apartment 3, El Segundo, Calif. 90245

[22] Filed: Nov. 14, 1974

[21] Appl. No.: 523,808

[52] U.S. Cl. ............... 312/100; 312/45; 211/60 G
[51] Int. Cl.² ........................................ A47B 81/00
[58] Field of Search ............ 211/60 G, 62, 63, 126; 312/36, 42, 45, 100, 111, 206; 348/96, 310, 311, 215; 221/50 C, 308; 206/19.5 R; 220/23, 83; 297/217, 194

[56] References Cited
UNITED STATES PATENTS

| 2,212,129 | 8/1940 | Rust | 312/45 |
|---|---|---|---|
| 3,343,869 | 9/1967 | Scheinwald | 297/217 |
| 3,361,504 | 1/1968 | Maslow et al. | 312/45 |
| 3,842,981 | 10/1974 | Lambert | 248/311 |

Primary Examiner—Casmir A. Nunberg

[57] ABSTRACT

A multiple beverage can holding assembly that may be removably mounted on a cart supported golf bag. The beverage cans are supported as a stack in the container, and may be removed one by one through an opening formed in the lower portion of the container. A cup is provided that has a gimbal assembly secured thereto. The cup is removably secured to the open end of the container. After a beverage can has been removed from the container and opened, the cup is removed from the container and thereafter mounted on the container by use of the gimbal assembly. The open beverage can may now be disposed in the cup, and the cup and beverage can thereafter remaining in a substantially vertical position due to the gimbal assembly when the bag is in either a vertical position, or a tilted position where the cup and container are free to pivot. After a beverage container has been emptied it is inserted through the open end of the container to rest on the stack of beverage cans remaining therein.

5 Claims, 5 Drawing Figures

U.S. Patent   Feb. 17, 1976   3,938,869
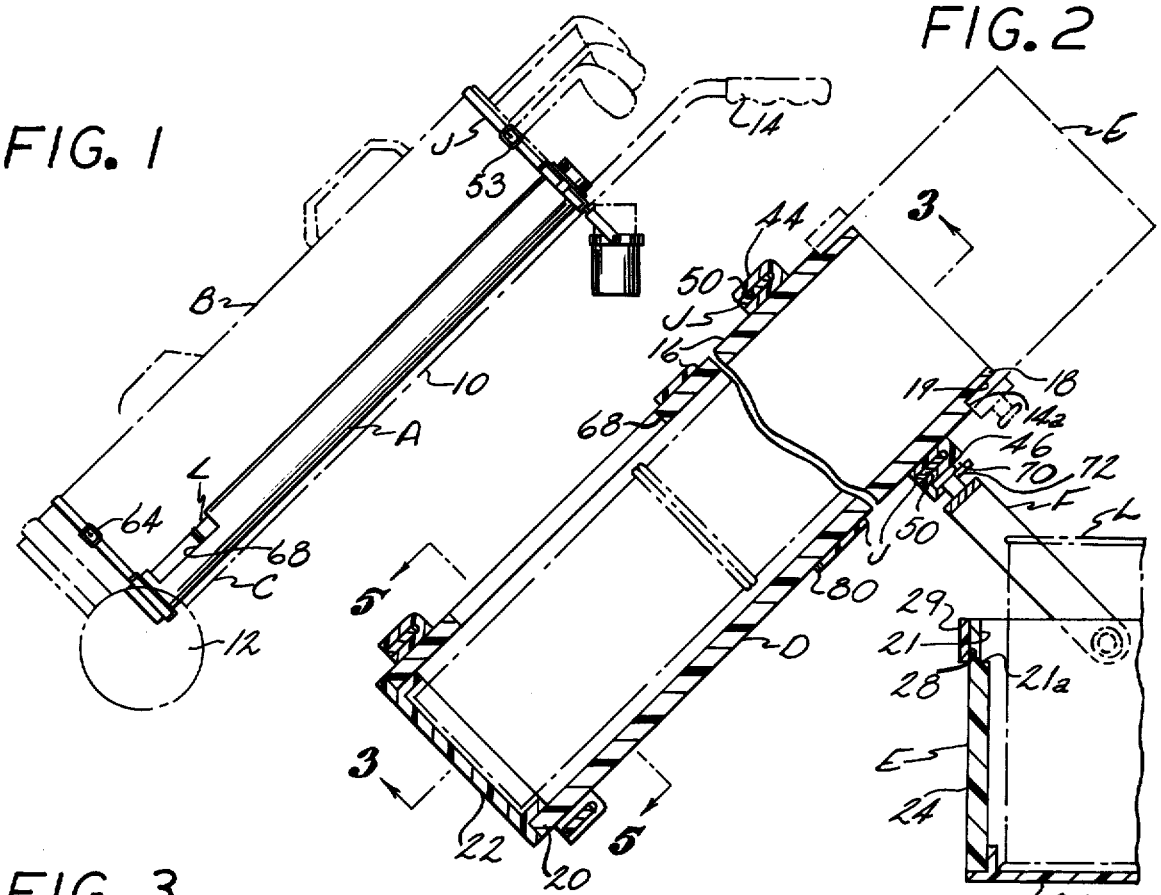
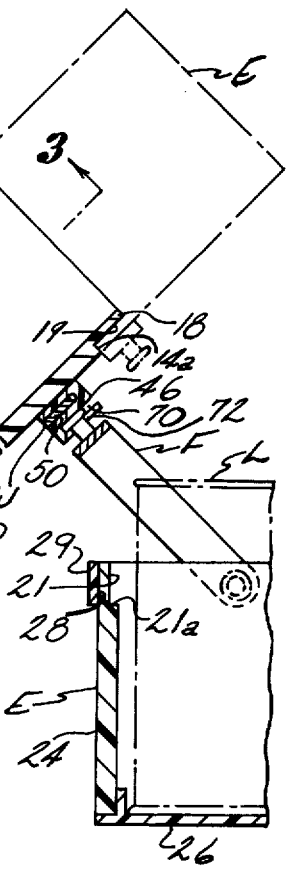
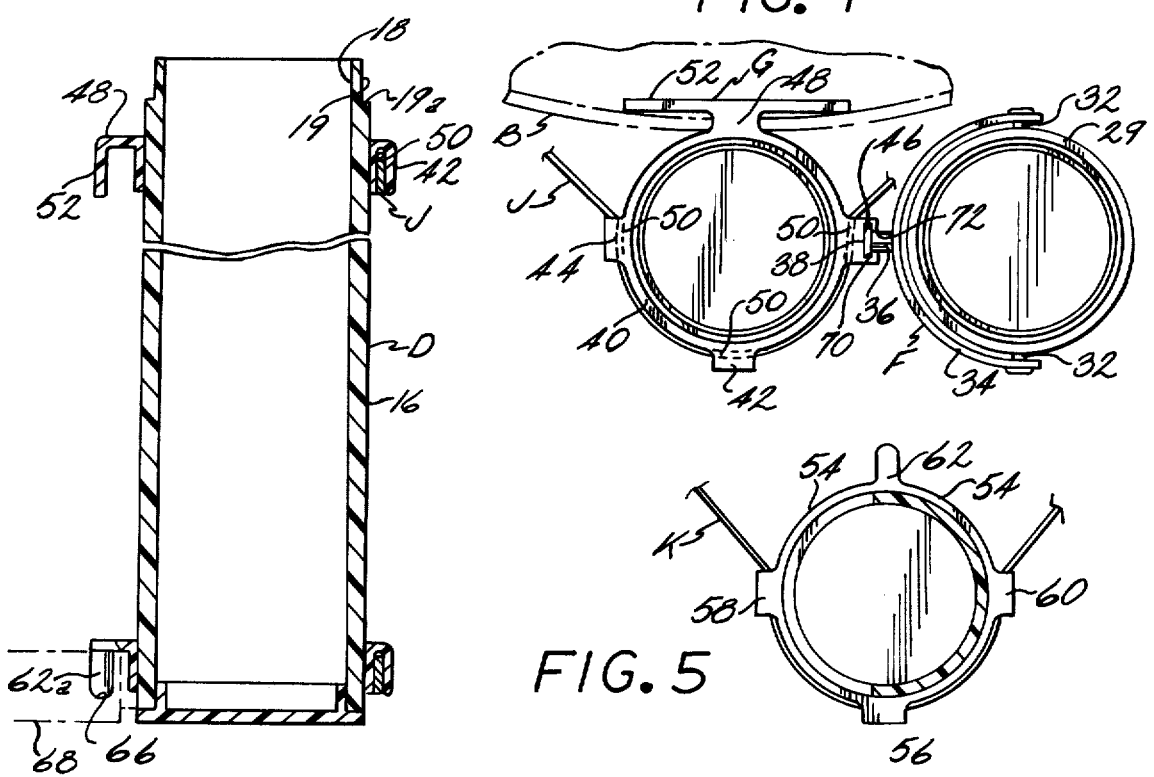
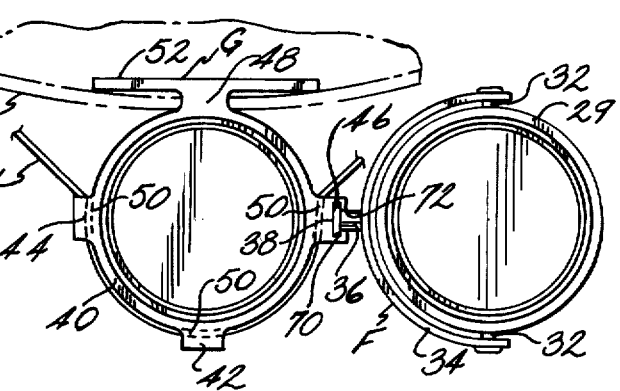
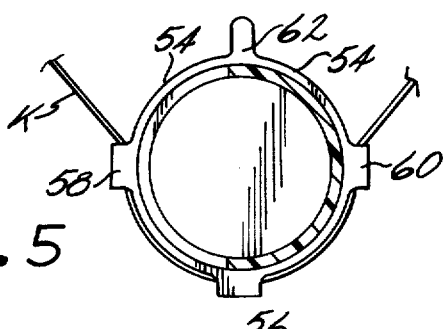

GOLF BAG SUPPORTED BEVERAGE CAN HOLDING ASSEMBLY

BACKGROUND OF THE INVENTION

1. Field of the Invention

Golf bag supported beverage can holding assembly.

2. Description of the Prior Art

In playing a round of golf, certain players desire to carry a number of cans of beverage with them for refreshment purposes. The carrying of such cans presents problems, in that, no compact means have been available previously for keeping the containers in a cool condition prior to being opened, nor have means been available to carry the empty cans back to the clubhouse where they may be disposed of in a trash receptacle.

The primary purpose in devising the present invention is to supply a light weight, inexpensive portable device that may be removably secured to a cart supported golf bag, and the device when so supported capable of holding a number of beverage cans in a stack configuration from which they may be removed one by one as required.

Another object of the invention is to supply a container for a number of beverage cans that has a cup removably secured to the upper end thereof, with the cup by a gimbal assembly associated therewith being securable to the upper portion of the container, and the cup capable of receiving and holding an open beverage can in a substantially vertical position both when the golf bag is vertically disposed as well as inclined at an angle.

A still further object of the invention is to supply a beverage can holding device that not only holds filled cans, but is adapted to receive the empty cans whereby the latter may be transported back to the clubhouse and disposed of in a suitable trash receptacle, rather than being discarded on the golf course.

SUMMARY OF THE INVENTION

The invention is adapted for use in carrying a number of beverage cans in a stack configuration when the device is removably secured to a golf bag, which bag in turn is mounted on a conventional cart. The invention includes an elongate container defined by a cylindrical side wall that has a first open end and a second lower end that is closed by a bottom. A cup is provided that slidably and removably engages the upper open end of the container, with the cup being defined by a cylindrical side wall, a bottom and an open end portion. The cup has a gimbal assembly associated therewith that may be removably secured to first means that form a part of the assembly, which first means is capable of positioning the container transversely relative to the bag. When the cup has been removed from the bag and supported from the first means by the gimbal assembly, the cup assumes a vertically disposed position. One of the cans of beverage that has been opened may then be disposed in the cup, and the can being held vertically therein to prevent the contents of the can being spilled irrespective of whether or not the golf bag is vertically positioned or is situated at an inclined angle.

The container has an opening in the lower portion thereof from which the beverage cans may be removed one by one for refreshment purposes. The container also has second means mounted thereon which are removably secured to the bag to hold the container in a fixed lateral position relative thereto. First and second straps are provided that are secured to the first and second means, with the straps encircling the bag to removably hold the invention in a fixed position thereon. As the cans are emptied, they are inserted into the upper portion of the container to rest on the stack of filled cans therein. After the invention has served its purpose, the cup is disengaged from the supported position on the container, and is inverted and slidagly mounted in a closing position on the upper end of the container. The container, and the cup, are preferably formed from a material such as plastic, that has low heat conductivity, to maintain the beverage cans situated in the container in a cool condition during the time they are being transported on the cart supported golf bag.

BRIEF DESCRIPTION OF THE DRAWING

FIG. 1 is a side elevational view of the moldable beverage can container removably supported from a golf bag that is mounted on a cart;

FIG. 2 is a longitudinal cross-sectional view of the container assembly;

FIG. 3 is a second longitudinal cross-sectional view of the container assembly taken on the line 3—3 of FIG. 2;

FIG. 4 is a fragmentary plan view of the container assembly mounted on a golf bag, with the latter being shown in phantom line; and FIG. 5 is a transverse cross-sectional view of the assembly taken on the line 5—5 of FIG. 2.

DESCRIPTION OF THE PREFERRED EMBODIMENT

The multiple beverage can holding container assembly A is shown in FIG. 1 as removably secured to a golf bag B of conventional design that is mounted on a cart C, with the bag and cart being shown in phantom line. The cart C includes a frame 10, a pair of supporting wheels 12, and a handle 14 for guiding and pushing the cart.

The assembly A includes an elongate container D that is defined by a cylindrical side wall 16 having a first open end 18 and a second lower end 20 that is closed by a bottom 22. A cup E is provided as may be seen in FIG. 2 that includes a cylindrical side wall 24, a bottom 26, and an open end portion 28.

The side wall 16 adjacent the first end 18 is formed with an externally recessed portion 19 that is adapted to slidably engage an internal recessed portion 21 on the cup E, to permit the cup to be removably mounted on the container in the closing position as shown in phantom line in FIG. 2. The recessed portions 19 and 21 now developed into body shoulders 19a and 21a that are in abutting contact with one another when the cup E is in the position shown in phantom line in FIG. 2. Container D and cup E are preferably formed from a commercially available plastic material that has good heat insulating characteristics. The cup E as may be seen in FIG. 2 has a gimbal assembly F operatively associated therewith, which gimbal assembly includes a band 29 that encircles the upper exterior portion of the cup E and the band 29 having two diametrically opposed first pins 32 that extend outwardly therefrom and pivotally engage a bail 34 of semi-circular shape. The bail 34 at substantially the center thereof has a third pin 36 extending outwardly therefrom, and the pin on the free end thereof supporting a circular plate 38.

First means G are provided on the upper portion of the container D to removably engage the upper open end of the bag B and removably support the assembly A in a fixed lateral position relative thereto. The first means G also pivotally engaging the third pin 36 and plate 38 to permit the gimbal assembly F to hold the cup E in a substantially vertical position both when the bag B is vertically positioned as well as when it is disposed at an angle at which the gimbal assembly is free to pivot.

The first means G includes a first circular band 40 that extends transversely around the portion of the side wall 16 adjacent the open end 18 thereof, with the band having first, second, third and fourth lugs 42, 44, 46 and 48 projecting outwardly therefrom. The lugs 42, 44, 46 and 48 are equally spaced from one another. The first, second and third lugs 42, 44, and 46, have slots 50 extending upwardly therein as may be seen in FIGS. 2 and 3.

The fourth lug 48 as shown in FIG. 4 has a transverse plate 52 secured thereto and extending downwardly therefrom, with the plate capable of engaging an interior upper end portion of the bag B. The slots 50 as shown in FIG. 4 are engaged by a first strap J that has a buckle 53 as illustrated in FIG. 1 included as a part thereof, with the strap encircling the upper portion of bag B to secure the assembly thereto. The lower exterior portion of the container has a second band 54 shown in FIG. 5 secured thereto, which band has first, second, third and fourth lugs 56, 58, 60 and 62 extending outwardly therefrom. The lugs 56, 58, 60 and 62 on the second band 54 are spaced on the quadrants thereof in the same manner as the lugs previously described on first band 40.

The first, second and third lugs 56, 58, 60 have slots 50 extending upwardly therein, and these slots being engaged by a second strap K that includes a buckle 64, with the strap extending around the lower exterior portion of the bag B to removably secure the assembly A thereto.

The fourth lug 62 has a pin 62a extending downwardly therefrom which pin is adapted to removably engage a recess 66 formed in a lug 68 that is included as a part of the bag structure B, with the recess 66 normally being used to receive the tip of an umbrella (not shown) that is carried with the bag B.

The beverage cans L as can be seen in FIGS. 1 and 2 are arranged in a stack end to end within the confines of the cylindrical side wall 16. The side wall 16 on the lower portion thereof is formed with a semi-circular opening 68 to permit the cans L to be removed one by one from the assembly A as required. Each time a can L is removed from the assembly the stack of cans L move downwardly by gravity to dispose another can in a position relative the opening 68 where it can be removed from the assembly A.

When the assembly A is to be used during the transportation thereof on bag B, the cap E is removed from the position on container D shown in phantom line in FIG. 2, and the gimball assembly F is then used to support the cup E in the position illustrated in solid line in FIG. 2 where a beverage can L that has been opened may be disposed therein. The cup E when supported by the gimbal assembly F will remain in a vertical position when the bag B is tilted, for the cup E may pivot relative to the bail F due to the pins 32, and the bail can pivot relative to third lug 46 due to the plate 38 and pin 36 rotating in a downwardly extending cavity 70 and communicating slot 72 formed in the third lug 46. The plate 38 and pin 36 are pivotally supported in the cavity 70 and slot 72 as shown in FIGS. 2 and 4.

When a can L is emptied, it is slid downwardly through the upper open end 18 of the side wall 16 to occupy a transportable position within the container D. When the assembly A has served the function of providing a support for an opened beverage can L, the cup E is removably mounted on the upper end of side wall 16 in the position shown in phantom line in FIG. 2. The assembly A can be removed from the bag B by separating the straps J and K therefrom by use of buckles 53 and 64.

Should it be desired a cylindrical shell 80 may be slidably mounted on the lower exterior portion of container D to close opening 68 except when a beverage can L is being removed from container D.

The use and operation of the invention has been described previously in detail and need not be repeated.

I claim:

1. In combination with a cart supported golf bag, which bag is of the type that has a lug supported from the lower portion thereof in which a longitudinal opening is defined to receive the tip of an umbrella and an open end through which golf clubs project, a multiple beverage can holding container assembly that may be removably secured to said bag, said can holding assembly including:

a. an elongate container defined by a cylindrical side wall that has a first open end and a second end closed by a bottom, said container being of sufficient length that a plurality of beverage cans may be arranged end to end as a stack therein, with a longitudinal opening in said side wall adjacent said bottom through which the lowermost one of said beverage cans may be withdrawn when desired; said stack moving downwardly by gravity to dispose another of said beverage cans in alignment with said opening when one of said beverage cans is withdrawn through the latter, and said beverage cans when emptied being insertable in said container through said first open end to rest on said stack;

b. an elongate cup having an open end, a cylindrical sidewall, and a bottom, said sidewall adjacent said open end of said cup being capable of snugly and slidably engaging said sidewall of said container adjacent said first end thereof to be removably supported from said container and close the latter;

c. a gimbal assembly secured to said cup adjacent said open end thereof and above the center of gravity of said cup;

d. first means secured to said container adjacent said first open end thereof for removably engaging said bag adjacent said open end thereof to transversely position said container relative to said bag, said first means removably supporting said gimbal assembly when said cup is removed from said container, with said cup when supported by said gimbal assembly from said first means capable of having one of said beverage containers disposed therein, and said cup and beverage container remaining in an upright position at all times when said bag is in either vertical or tilted in a direction in which said gimbal assembly is free to pivot, said first means including:

1. a first circumferentially extending band secured to said container adjacent said first open end thereof;
2. a plurality of circumferentially spaced first lugs secured to said first band, with one of said lugs having said cavity and transverse slot therein; and
3. a plate secured to one of said first lugs, said plate being insertable in the open end of said golf bag to laterally position said container to the latter;

e. second means secured to said container for removably engaging said opening in said bag to transversely position the lower portion of said container adjacent said bottom relative to said bag; said second means including:
1. a second circumferentially extending band secured to said container adjacent said bottom thereof;
2. at least one second lug that extends outwardly from said second band; and
3. a third pin secured to said second lug that removably engages said opening in said lug secured to said golf bag;

f. strap means operatively associated with said first and second means, which strap means encircle said bag and secure said can holding assembly thereto, and g. cover means removably supported from said container for closing said opening in said container through which said cans are sequentially removed.

2. A can holding assembly as defined in claim 1 in which said gimbal assembly includes:
  g. two diametrically opposed first pins that extend outwardly from said cup adjacent said open end thereof;
  h. a bail that pivotally engages said first pins;
  i. a second pin that extends outwardly from substantially the center of said bail; and
  j. a circular plate secured to said second pin, with said circular plate and second pin removably and pivotally engaging a cavity and transverse slot formed in said first means to support said gimbal assembly and cup therefrom.

3. A can holding assembly as defined in claim 1 in which said strap means includes:
  n. a first strap that is removably positionable in slots formed in said first lugs, with said first strap encircling said bag to hold said can holding assembly in a secure position thereon.

4. A can holding assembly as defined in claim 3 in which said strap means includes:
  n. a second strap that is removably positionable in slots formed in said second lugs, with said second strap encircling said bag to hold said can holding assembly in a secure position thereon.

5. A can holding assembly as defined in claim 4 in which said cover means is a cylindrical sleeve slidably mounted on said container.

* * * * *